(12) United States Patent
Onishi et al.

(10) Patent No.: US 11,547,974 B2
(45) Date of Patent: Jan. 10, 2023

(54) SLURRY MANUFACTURING DEVICE AND OPERATING METHOD FOR SLURRY MANUFACTURING DEVICE

(71) Applicant: NIHON SPINDLE MANUFACTURING CO., LTD., Hyogo (JP)

(72) Inventors: Keiichiro Onishi, Hyogo (JP); Keiichi Asami, Hyogo (JP); Tatsuaki Oonishi, Hyogo (JP)

(73) Assignee: NIHON SPINDLE MANUFACTURING CO., LTD., Hyogo (JP)

( * ) Notice: Subject to any disclaimer, the term of this patent is extended or adjusted under 35 U.S.C. 154(b) by 259 days.

(21) Appl. No.: 16/818,739

(22) Filed: Mar. 13, 2020

(65) Prior Publication Data

US 2020/0222863 A1    Jul. 16, 2020

Related U.S. Application Data

(63) Continuation of application No. PCT/JP2018/032580, filed on Sep. 3, 2018.

(30) Foreign Application Priority Data

Oct. 30, 2017   (JP) .............................. JP2017-209325

(51) Int. Cl.
*B01F 23/00*    (2022.01)
*B01F 23/50*    (2022.01)
(Continued)

(52) U.S. Cl.
CPC ............ *B01F 23/59* (2022.01); *B01F 23/565* (2022.01); *B01F 25/64* (2022.01);
(Continued)

(58) Field of Classification Search
CPC .. B01F 23/565; B01F 35/71731; B01F 35/93; B01F 25/64
See application file for complete search history.

(56) References Cited

U.S. PATENT DOCUMENTS

| 3,326,536 | A | * | 6/1967 | Zingg | ..................... B01F 25/74 366/17 |
| 4,685,375 | A | * | 8/1987 | Ross | ................... C06B 21/0008 86/20.12 |
| 5,222,807 | A | | 6/1993 | Gaddis | |

FOREIGN PATENT DOCUMENTS

| JP | H05-022378 U | 3/1993 |
| JP | H07-016442 A | 1/1995 |

(Continued)

OTHER PUBLICATIONS

Search Report issued in European Application No. 18874017.9-1017, dated Jul. 20, 2020.

(Continued)

*Primary Examiner* — Anshu Bhatia

(74) *Attorney, Agent, or Firm* — Michael Best & Friedrich LLP

(57) ABSTRACT

Provided is a slurry manufacturing method in which a decrease in slurry quality, an increase in running cost, and a decrease in maintainability are suppressed. A slurry manufacturing device includes: a mixing device (suction pump mechanism portion) that mixes a liquid and a powder to manufacture a slurry; a powder supply device that supplies the powder to the mixing device; and a powder dry box, in which an opening portion of the powder supply device is accommodated in the powder dry box.

13 Claims, 8 Drawing Sheets

(51) Int. Cl.
  *H01M 4/139*    (2010.01)
  *H01M 10/0562*  (2010.01)
  *B01F 25/64*    (2022.01)
  *B01F 35/93*    (2022.01)
  *B01F 35/71*    (2022.01)
  *B01F 35/90*    (2022.01)
  *B01F 101/59*   (2022.01)

(52) U.S. Cl.
  CPC ........ *B01F 35/71731* (2022.01); *B01F 35/93* (2022.01); *H01M 4/139* (2013.01); *H01M 10/0562* (2013.01); *B01F 2035/98* (2022.01); *B01F 2101/59* (2022.01)

(56) References Cited

FOREIGN PATENT DOCUMENTS

| | | |
|---|---|---|
| JP | 2006-341191 A | 12/2006 |
| JP | 5625216 B2 | 11/2014 |
| JP | 2015-005372 A | 1/2015 |
| JP | 2015-035344 A | 2/2015 |
| WO | 2010/140516 A1 | 12/2010 |
| WO | 2013/093942 A2 | 6/2013 |

OTHER PUBLICATIONS

International Search Report issued in Application No. PCT/JP2018/032580, dated Nov. 6, 2018.

\* cited by examiner

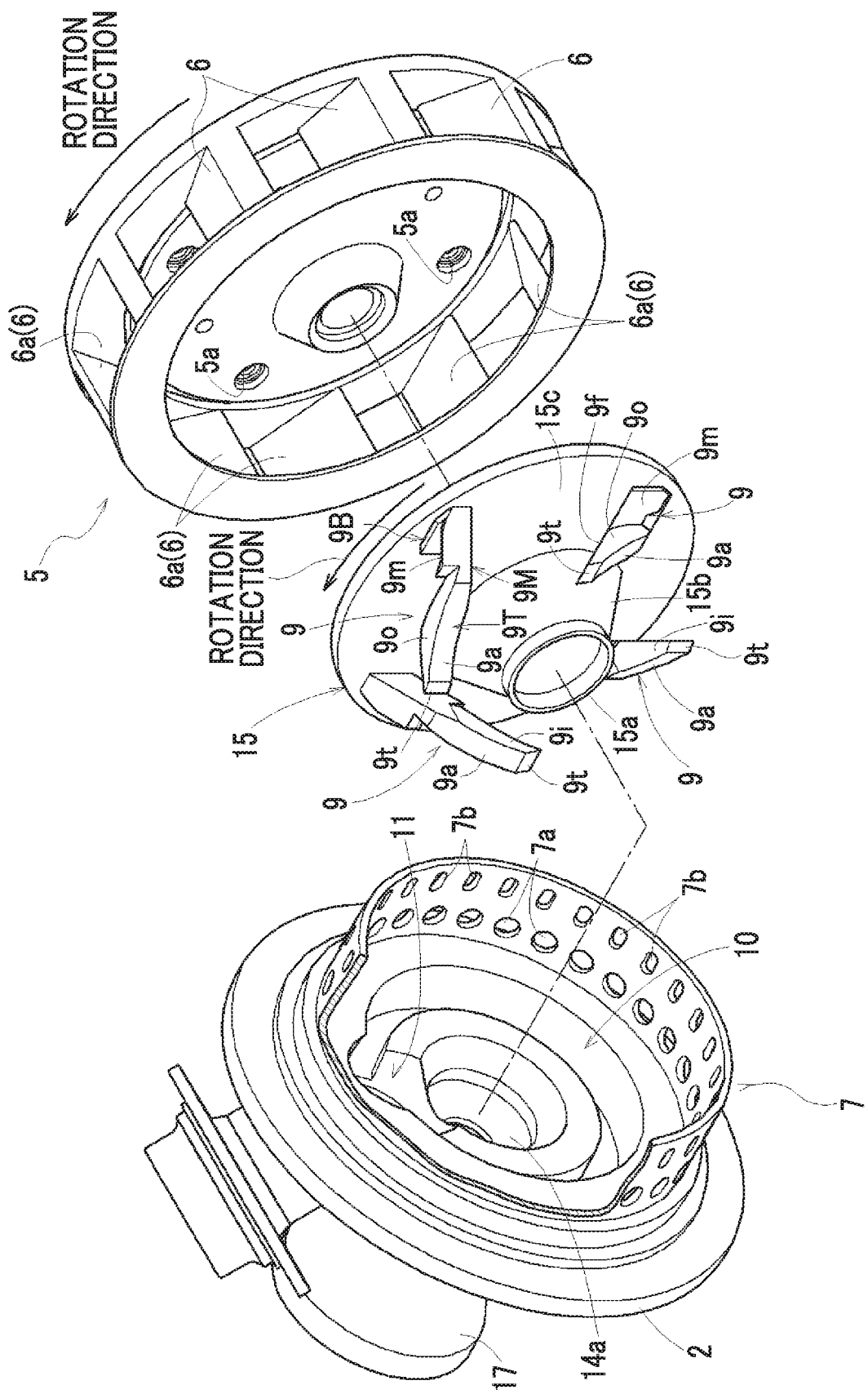

SLURRY MANUFACTURING DEVICE AND OPERATING METHOD FOR SLURRY MANUFACTURING DEVICE

RELATED APPLICATIONS

The contents of Japanese Patent Application No. 2017-209325, and of International Patent Application No. PCT/JP2018/032580, on the basis of each of which priority benefits are claimed in an accompanying application data sheet, are in their entirety incorporated herein by reference.

BACKGROUND

Technical Field

Certain embodiments of the present invention relate to a slurry manufacturing device and an operating method for a slurry manufacturing device.

Description of Related Art

In the related art, a slurry manufacturing device for manufacturing a slurry by mixing a powder and a liquid has been used. The related art discloses a dispersion system that suctions and mixes a powder supplied to a hopper and a liquid with a centrifugal dispersion mixing pump.

SUMMARY

Configuration 1

According to an embodiment of the present invention, there is provided a slurry manufacturing device including: a mixing device that mixes a liquid and a powder to manufacture a slurry; a powder supply device that supplies the powder to the mixing device; and a powder dry box, in which an opening portion of the powder supply device is accommodated in the powder dry box.

Configuration 10

According to another embodiment of the present invention, there is provided an operating method for a slurry manufacturing device, in which the slurry manufacturing device includes: a mixing device that mixes a liquid and a powder to manufacture a slurry; a powder supply device that supplies the powder to the mixing device; a powder dry box; and a main body dry box that accommodates the mixing device therein, an opening portion of the powder supply device being accommodated in the powder dry box, the operating method including: causing both the powder dry box and the main body dry box to perform operations while the powder is supplied from the powder supply device to the mixing device; and causing the powder dry box to stop the operation and causing the main body dry box to perform the operation when the supply of the powder from the powder supply device to the mixing device is completed.

BRIEF DESCRIPTION OF THE DRAWINGS

FIG. 7 is an exploded perspective view illustrating an assembly configuration of a front wall portion of a main body casing, a stator, a partition plate, and a rotor.

DETAILED DESCRIPTION

Figure 1:
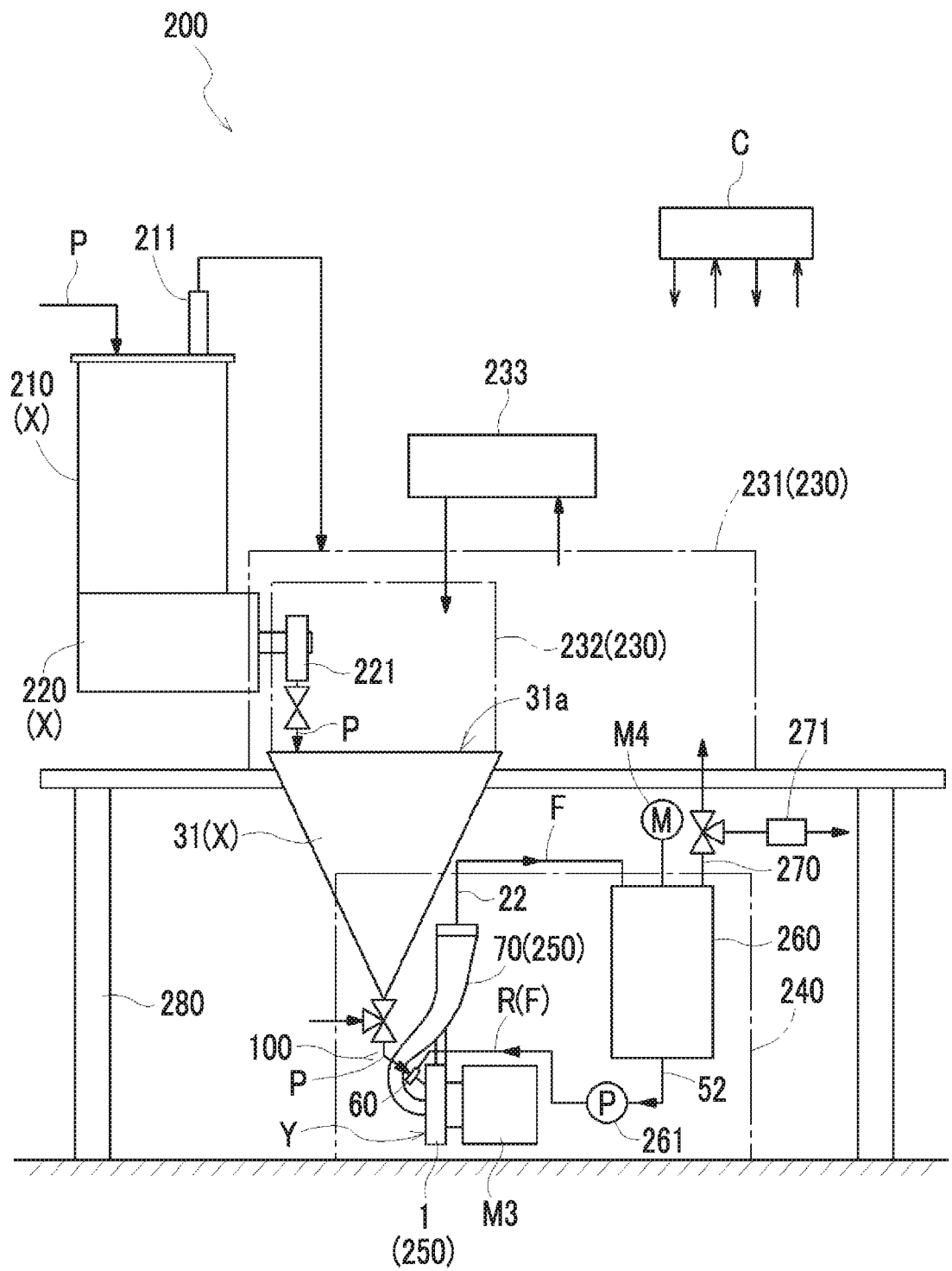
FIG. 1 is a view showing an outline of a slurry manufacturing device.

Among powders used as materials for a slurry, there are some powders that absorb moisture in the air and alters or solidify. In a case of manufacturing a slurry with a device of the related art using such a powder, the following is incurred. In the device of the related art, the upper inlet of the hopper is opened. Then, when the powder is fed into the hopper or when the powder stored in the hopper is stirred, the powder absorbs moisture in the surrounding air, and the quality of the slurry deteriorates. As a method for preventing the powder from absorbing moisture, dehumidification of a room in which the device is installed can be considered. However, dehumidification of a large room for a long period of time requires high running costs. In addition, installing the entire device in a dehumidified glove box or the like is considered, but this significantly reduces the maintainability.

It is desirable to provide a slurry manufacturing method in which a decrease in slurry quality, an increase in running cost, and a decrease in maintainability are suppressed.

According to the embodiment of the present invention, since the opening portion of the powder supply device is accommodated in the powder dry box, a situation where the powder comes into contact with moist air can be avoided, and deterioration of the quality of the slurry can be suppressed. In addition, since the powder dry box only needs to accommodate at least the opening portion of the powder supply device, large-scale equipment is not required, and an increase in running cost and a decrease in maintainability can be suppressed.

Configuration 2

In the slurry manufacturing device according to the embodiment of the present invention, the powder supply device may include a hopper having an open upper side, and a feeder that supplies the powder to the hopper, and an opening portion of the hopper and a powder discharge port of the feeder are accommodated in the powder dry box.

According to the embodiment of the present invention, since the opening portion of the hopper and the powder discharge port of the feeder are accommodated in the powder dry box, a situation where the powder comes into contact with moist air can be avoided, and deterioration of the quality of the slurry can be suppressed.

Configuration 3

In the slurry manufacturing device according to the embodiment of the present invention, the powder supply device may include a feeder hopper that supplies the powder to the feeder, and an air vent of the feeder hopper may be connected to the powder dry box.

According to the embodiment of the present invention, since the air vent of the feeder hopper is connected to the powder dry box, dry air in the feeder hopper can be used in the powder dry box, and an increase in running cost can be further suppressed.

Configuration 4

The slurry manufacturing device according to the embodiment of the present invention may further include a main body dry box that accommodates the mixing device therein.

According to the embodiment of the present invention, since the main body dry box that accommodates the mixing device therein is included, a situation where the powder comes into contact with the moist air can be more appropriately avoided, and the deterioration of the quality of the slurry can be suppressed.

Configuration 5

In the slurry manufacturing device according to the embodiment of the present invention, a dew point temperature of the main body dry box may be higher than a dew point temperature of the powder dry box.

Since the possibility that the powder may be directly exposed is small in the main body dry box, the dryness required is lower than that of the powder dry box. According to the embodiment of the present invention, since the dew point temperature of the main body dry box is higher than the dew point temperature of the powder dry box, an increase in running cost can be further suppressed.

Configuration 6

In the slurry manufacturing device according to the embodiment of the present invention, a cooling device that cools the mixing device may be accommodated in the main body dry box.

There are cases where the cooling device is provided in the mixing device in order to suppress alteration of the slurry due to a temperature rise. According to the embodiment of the present invention, since the cooling device that cools the mixing device is accommodated in the main body dry box, the occurrence of condensation on the surface of the cooling device can be suppressed, which is suitable.

Configuration 7

In the slurry manufacturing device according to the embodiment of the present invention, the mixing device may be a centrifugal dispersion mixing pump.

Configuration 8

In the slurry manufacturing device according to the embodiment of the present invention, the slurry may be a positive electrode active material slurry, a negative electrode active material slurry, or a solid electrolyte slurry used for manufacturing an all-solid-state battery.

Configuration 9

In the slurry manufacturing device according to the embodiment of the present invention, the powder may contain a sulfide solid electrolyte.

According to the embodiment of the present invention, since both the powder dry box and the main body dry box perform the operations while the powder is supplied from the powder supply device to the mixing device, a situation where the powder comes into contact with moist air can be avoided, and deterioration of the quality of the slurry can be suppressed. In addition, since the operation of the powder dry box is stopped and the operation of the main body dry box is performed when the supply of the powder from the powder supply device to the mixing device is completed, an increase in running cost can be suppressed.

The case where the supply of the powder is completed includes a case where the supply of the powder from the powder supply device to the mixing device is completed and no powder remains in the powder supply device, and a case where although the powder remains in the powder supply device, the supply of the powder from the powder supply device into the mixing device is stopped, and the powder supply device is closed by closing a feed port through which the powder is supplied from the outside to the powder supply device with a lid, shutter, or the like.

As illustrated in FIG. 1, a slurry manufacturing device 200 according to the present embodiment is configured to include a dispersion system 100, a powder dry box 230, a main body dry box 240, and a control unit C.

The dispersion system 100 is configured to include a powder supply device X, a suction pump mechanism portion Y, a mixing mechanism 60, a recirculation mechanism portion 70, a cooling device 250, a tank 260, and a pressure vent portion 270.

In the slurry manufacturing device 200, a slurry F is generally manufactured as follows. A powder P supplied from the powder supply device X and a liquid R (or slurry F) supplied from the tank 260 by a pump 261 are mixed by the mixing mechanism 60 and supplied to the suction pump mechanism portion Y. In the suction pump mechanism portion Y, the powder P and the liquid R are dispersed and mixed and sent to the recirculation mechanism portion 70. The recirculation mechanism portion 70 circulates and supplies the liquid R containing the powder P that has not been completely dissolved (hereinafter, undissolved slurry Fr) to the suction pump mechanism portion Y, and sends the slurry F to the tank 260. The slurry F inside the tank 260 is stirred by a tank stirring motor M4.

The powder dry box 230 and the main body dry box 240 are provided to partition the internal spaces from the external spaces with, for example, a panel made of a synthetic resin in order to maintain only a limited necessary atmosphere in a predetermined state. However, the powder dry box 230 and the main body dry box 240 may be used to block the powder P in the internal spaces from moisture and may be made of various materials having heat insulation, or metal.

The powder dry box 230 is configured to include an outer box 231 and an inner box 232. The suction side of a dehumidifying unit 233 is connected to the outer box 231, and the exhaust side thereof is connected to the inner box 232. Then, the operating conditions of the dehumidifying unit 233 are adjusted such that the atmospheric pressure in the inner box 232 is maintained at a positive pressure higher than the atmospheric pressure outside the powder dry box 230 (hereinafter referred to as "outside air pressure"), that is, for example, in a state higher than that by about 2 to 3 Pa. The atmospheric pressure in the outer box 231 is maintained at a negative pressure lower than the outside air pressure, that is, for example, in a state lower than that by about 1 to 2 Pa. In the present embodiment, the dew point temperature of the outer box 231 is maintained at, for example, −40° C. or lower, and the dew point temperature of the inner box 232 is maintained at, for example, −70° C. or lower.

By causing the dew point temperature of the inner box 232 to be lower than the dew point temperature of the outer box 231, the dew point temperature in the outer box 231 is adjusted to be low, and the dew point temperature in the inner box 232 is adjusted to be lower, whereby the dew point temperature can be lowered stepwise. Accordingly, adjustment of the low dew point temperature in the inner box 232 is facilitated, and the running cost can be reduced.

The dew point temperatures of the outer box 231 and the inner box 232 are not limited to those described above, and can be appropriately set according to the properties of the powder P and the like.

Furthermore, as described above, by causing the atmospheric pressure of the outer box 231 to be a negative pressure lower than the outside air pressure, the diffusion of odors contained in the outer box 231 to the outside can be suppressed. In addition, since the atmospheric pressure of the inner box 232 is higher than the atmospheric pressure of the outer box 231, the air flow toward the inner box 232 is impeded, and the dew point temperature of the inner box 232 can be easily adjusted, for example, can be maintained at −70° C. or lower.

In the present embodiment, unlike the powder dry box 230, the main body dry box 240 having a single structure is used. The dew point temperature of the main body dry box 240 is maintained at, for example, −40° C. or lower by a dehumidifying unit (not illustrated).

Here, in a case where the dew point temperature of the outer box 231 is maintained at, for example, −40° C. or lower, the dew point temperature of the inner box 232 is maintained at, for example, −70° C. or lower, and the dew point temperature of the main body dry box 240 is maintained at, for example, −40° C. or lower, the flow of the has, for example, the following two systems. One of the two systems is the air flow in the powder dry box 230, in which air flows in a circulation of a flow from the dehumidifying unit 233 for the powder dry box 230 through the inner box 232 (positive pressure higher than the outside air pressure) and the outer box 231 (negative pressure lower than the outside air pressure) to the dehumidifying unit 233. The other of the two systems is the air flow in the main body dry box 240, in which air flows in a circulation of a flow from the dehumidifying unit (not illustrated) through the main body dry box 240 to the dehumidifying unit (not illustrated).

The dew point temperature in the main body dry box 240 may be any temperature that does not cause condensation in the cooling device 250, and for example, may be −20° C. to −30° C. In this case, when the dew point temperature of the outer box 231 is maintained at, for example, −40° C. or lower and the dew point temperature of the inner box 232 is maintained at, for example, −70° C. or lower, the air flow can be, for example, as follows. The air can flow from the dehumidifying unit 233 for the powder dry box 230 through the inner box 232 (positive pressure higher than the outside air pressure), the main body dry box 240, the outer box 231 (negative pressure lower than the outside air pressure), and then to the dehumidifying unit 233, in this order. In this case, the main body dry box 240 is set to a positive pressure higher than that of the outer box 231 and to a negative pressure lower than that of the inner box 232. By configuring the air flow in this way, the dehumidifying unit 233 can be shared by the powder dry box 230 and the main body dry box 240, and there is no need to separately provide the dehumidifying unit (not illustrated) for the main body dry box 240 and the dehumidifying unit 233, thereby suppressing an increase in cost.

The powder supply device X is configured to include a feeder hopper 210, a feeder 220, and a hopper 31.

The feeder hopper 210 is a hopper that temporarily stores the powder P dry-transported from upstream. The feeder hopper 210 has an air vent 211 connected to the powder dry box 230. The air vent 211 discharges the dry air inside the feeder hopper 210 into the powder dry box 230 when the internal pressure of the feeder hopper 210 increases with the feeding of the powder P from the upstream. The air vent 211 is provided with a check valve, and when the feeder hopper 210 is not under pressure, the feeder hopper 210 is preferably closed so that the powder P is not affected by moisture.

The feeder 220 discharges the powder P stored in the feeder hopper 210 from a powder discharge port 221 (an example of an opening portion) while measuring the powder P. The feeder 220 is, for example, a screw type feeder. The powder discharge port 221 is disposed inside the inner box 232 of the powder dry box 230. The powder P discharged from the powder discharge port 221 falls inside the inner box 232 of the powder dry box and is fed into the hopper 31 from an upper opening portion 31a of the hopper 31.

The hopper 31 is a member having an inverted conical shape which is decreased in diameter from the upper portion toward the lower portion, and causes the powder P received from the upper opening portion 31a to be discharged from a lower opening portion 31b and supplied to the mixing mechanism 60. The upper opening portion 31a of the hopper 31 is disposed inside the inner box 232 of the powder dry box 230.

As described above, in the present embodiment, the powder discharge port 221 of the feeder 220 that is the opening portion of the powder supply device X, and the upper opening portion 31a of the hopper 31 are accommodated in the inner box 232 of the powder dry box 230. In addition, the air vent 211 of the feeder hopper 210 is connected to the outer box 231 of the powder dry box 230.

The cooling device 250 is a device that cools the suction pump mechanism portion Y. Specifically, the cooling device 250 is a cold water jacket through which supplied cold water flows, and is provided so as to cover a main body casing 1 of the suction pump mechanism portion Y and the recirculation mechanism portion 70.

In the present embodiment, as illustrated in FIG. 1, the suction pump mechanism portion Y (an example of a mixing device), the mixing mechanism 60, the recirculation mechanism portion 70, the cooling device 250, and the tank 260 are accommodated inside the main body dry box 240. In the present embodiment, the dew point temperature of the main body dry box 240 is, for example, −40° C., which is higher than −70° C. which is an example of the dew point temperature of the powder dry box 230.

The pressure vent portion 270 reduces the pressure in the tank 260 by exhausting gas from the tank 260. Specifically, the pressure vent portion 270 is a gas flow path, and connects the inside of the tank 260 to the outer box 231 of the powder dry box 230 via a valve. A gas flow path branched from the valve to exhaust the gas from the tank 260 to the outside is provided, and a filter 271 is disposed in the gas flow path. When the gas is exhausted from the tank 260 to the outside, the gas in the tank 260 is exhausted through the filter 271. Accordingly, malodor and scattering of substances are suppressed.

The control unit C is a calculation processing device including a CPU, a storage unit, and the like, and controls the overall operation of the slurry manufacturing device 200. In particular, the control unit C controls the operations of the powder dry box 230 and the main body dry box 240. The control unit C causes both the powder dry box 230 and the main body dry box 240 to perform operations while the powder is supplied from the powder supply device X to the suction pump mechanism portion Y (mixing device). When the supply of the powder from the powder supply device X to the suction pump mechanism portion Y is completed, the operation of the powder dry box 230 is stopped, and the operation of the main body dry box 240 is performed.

The case where the supply of the powder is completed includes a case where the supply of the powder from the powder supply device X to the suction pump mechanism portion (mixing device) Y is completed and no powder remains in the powder supply device X, and a case where although the powder remains in the powder supply device X, the supply of the powder from the powder supply device X into the suction pump mechanism portion Y is stopped, and the powder supply device X is closed by closing a feed port through which the powder is supplied from the outside to the powder supply device X with a lid, shutter, or the like (not illustrated). As described above, by closing the powder supply device X even if the powder remains in the powder supply device X, moisture absorption by the powder can be suppressed.

Here, in the present embodiment, as illustrated in FIG. 1, the feeder hopper 210 and feeder 220 of the powder supply device X and the powder dry box 230 are placed on a stand 280 and disposed above the suction pump mechanism portion Y (mixing device). The upper opening portion 31a of the hopper 31 is disposed above the stand 280. The lower opening portion (31b) of the hopper 31 is disposed below the stand 280.

In the slurry manufacturing device 200, it is possible to manufacture the slurry F using various kinds of powder P and liquid R. In particular, the slurry manufacturing device 200 can be suitably used for manufacturing a slurry for manufacturing a positive electrode, a negative electrode, or a solid electrolyte of an all-solid-state battery, that is, a positive electrode active material slurry, a negative electrode active material slurry, or a solid electrolyte slurry.

The positive electrode active material slurry is manufactured by dispersing a positive electrode active material, a conductivity aid, a binder, and the like in a solvent. The negative electrode active material slurry is manufactured by dispersing a negative electrode active material, a conductivity aid, a binder, and the like in a solvent. The solid electrolyte slurry is manufactured by dispersing a solid electrolyte, a conductivity aid, a binder, and the like in a solvent. The positive electrode active material slurry may contain a solid electrolyte. The negative electrode active material slurry may contain a solid electrolyte.

The positive electrode active material is exemplified by an olivine type positive electrode active material. The olivine type positive electrode active material is a material having an olivine type structure, and is not particularly limited as long as it is a positive electrode active material that can be used for a lithium-ion battery. Examples of the olivine type positive electrode active material include active materials represented by a chemical formula $Li_xM_yPO_z$ (M=Fe, Mn, Co, and Ni, 0.5≤x≤1.5, 0.5≤y≤1.5, 2≤z≤7). Particularly, $LiFePO_4$, which is an olivine type positive electrode active material having high material stability and a large theoretical capacity, is preferable.

The negative electrode active material is not particularly limited as long as lithium ions and the like can be occluded and released. Specific examples of the negative electrode active material may include metals such as Li, Sn, Si, or In, alloys of Li and Ti, Mg, or Al, or carbon materials such as hard carbon, soft carbon, or graphite, and combinations of these. In particular, from the viewpoint of cycle characteristics and discharge characteristics, lithium titanate (LTO, $Li_4Ti_5O_{12}$) and a lithium-containing alloy are preferable.

As the solid electrolyte, a sulfide solid electrolyte used as a solid electrolyte of an all-solid-state battery can be used. Examples thereof include $Li_2S$—$SiS_2$, LiX—$Li_2S$—$SiS_2$, LiX—$Li_2S$—$P_2S_5$, LiX—$Li_2S$—$P_2S_5$, LiX—$Li_2S$—$Li_2O$—$P_2S_5$, $Li_2S$—$P_2S_5$, $Li_3PS_4$—LiI—LiBr, and the like. Here, "X" represents I and/or Br.

The conductivity aid is exemplified by, as well as carbon materials such as vapor grown carbon fiber (VGCF), acetylene black, ketjen black, carbon nanotube (CNT), or carbon nanofiber (CNF), metals such as nickel, aluminum, or stainless steel, and combinations thereof.

The binder is exemplified by polymer resins such as polyvinylidene fluoride (PVDF), polytetrafluoroethylene (PTFE), polyimide (PI), polyamide (PA), polyamide-imide (PAI), butadiene rubber (BR), styrene-butadiene rubber (SBR), nitrile-butadiene rubber (NBR), styrene-ethylene-butylene-styrene block copolymer (SEBS), or carboxymethylcellulose (CMC), and combinations thereof.

The solvent is exemplified by butyl butyrate and dehydrated heptane.

Hereinafter, the configuration of the slurry manufacturing device 200, particularly the configuration of the dispersion system 100 will be described in more detail.

Powder Supply Device

Figure 2:
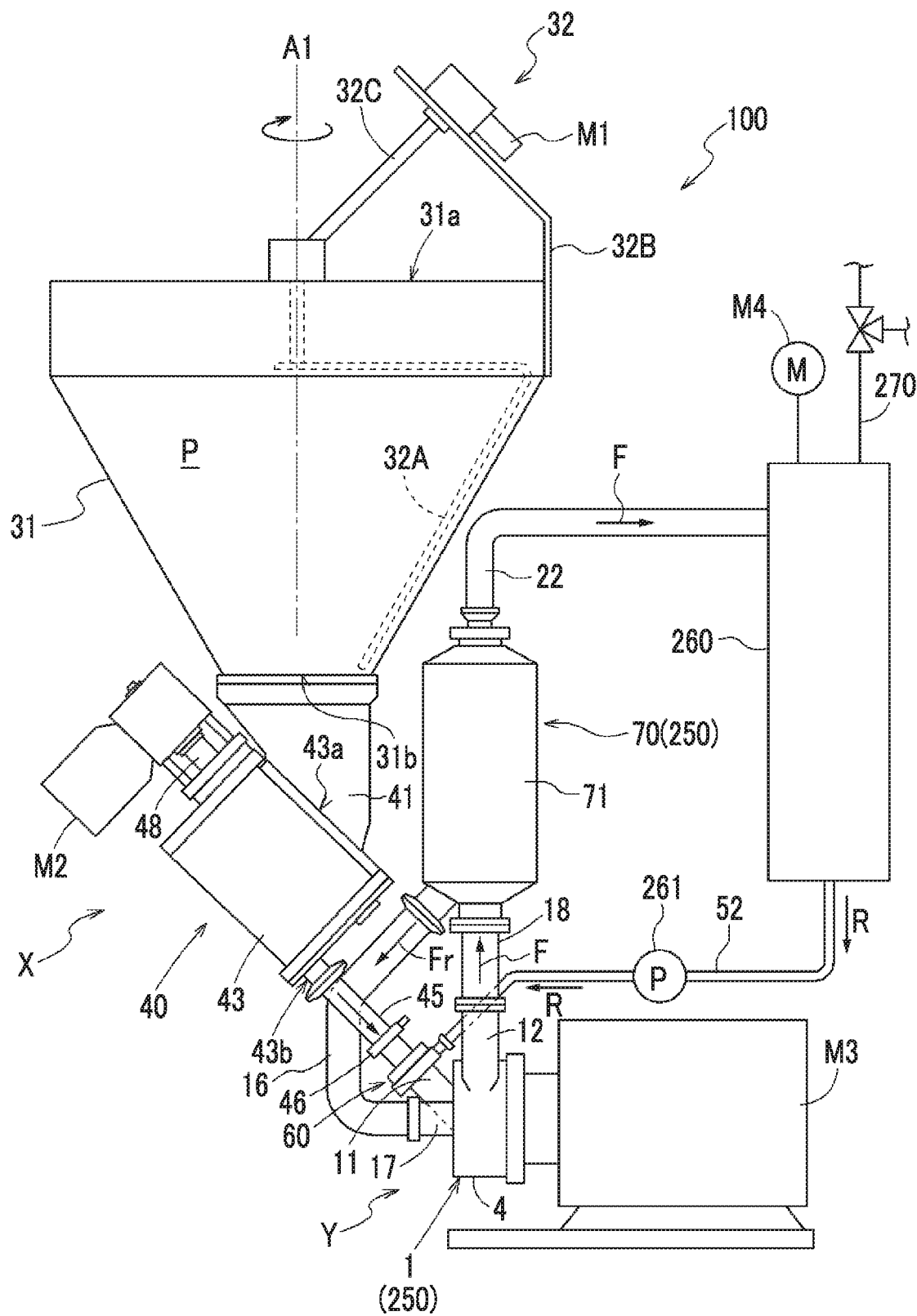
FIG. 2 is a schematic configuration view of a dispersion system including a centrifugal suction pump mechanism portion.

As illustrated in FIG. 2, the powder supply device X includes: the hopper 31 that discharges the powder P received from the upper opening portion 31a from the lower opening portion 31b; a stirring mechanism 32 that stirs the powder P in the hopper 31; and a volumetric quantitative supply section 40 which quantitatively supplies the powder P, which is discharged from the lower opening portion 31b, to the suction pump mechanism portion Y by a negative pressure suction force acting on the lower opening portion 31b by the suction of the suction pump mechanism portion Y connected to the downstream side of the lower opening portion 31b, in a state where the upper opening portion 31a of the hopper 31 is open to the atmosphere.

The hopper 31 is formed in an inverted conical shape that is decreased in diameter from the upper portion toward the lower portion and is disposed in a posture with a center axis A1 directed along a vertical direction. The transverse sectional shape of each of the upper opening portion 31a and the lower opening portion 31b of the hopper 31 is a circular shape centered on the center axis A1 when viewed in an up-down direction of FIG. 2, and the inclination angle of the inner wall surface of the inverted conical shape in the hopper 31 is generally approximately 60 degrees with respect to a horizontal plane. However, the inclination angle can be changed according to the properties of the powder. For example, in a case where the powder is carbon black, the inclination angle can be, for example, about 45 degrees.

The stirring mechanism 32 is configured to include: a stirring blade 32A that is disposed in the hopper 31 and stirs the powder P in the hopper 31; a blade drive motor M1 that rotates the stirring blade 32A around the center axis A1 of the hopper 31; an attachment member 32B that supports the blade drive motor M1 to be positioned above the upper opening portion 31a of the hopper 31; and a transmission member 32C that transmits the rotational driving force of the blade drive motor M1 to the stirring blade 32A.

The stirring blade 32A is configured by bending a rod-shaped member into a substantially V-shape, and is disposed so that in a state where one side portion is directed along the inner wall surface of the hopper 31, an end portion of the other side portion is pivotally supported so as to rotate coaxially with the center axis A1 of the hopper 31. Furthermore, the stirring blade 32A has a transverse sectional shape formed in a triangular shape, and is disposed so that a surface forming one side of the triangle is substantially parallel to the inner wall surface of the hopper 31. Accordingly, the stirring blade 32A is disposed so as to rotate around the center axis A1 along the inner wall surface of the hopper 31.

Figure 3:
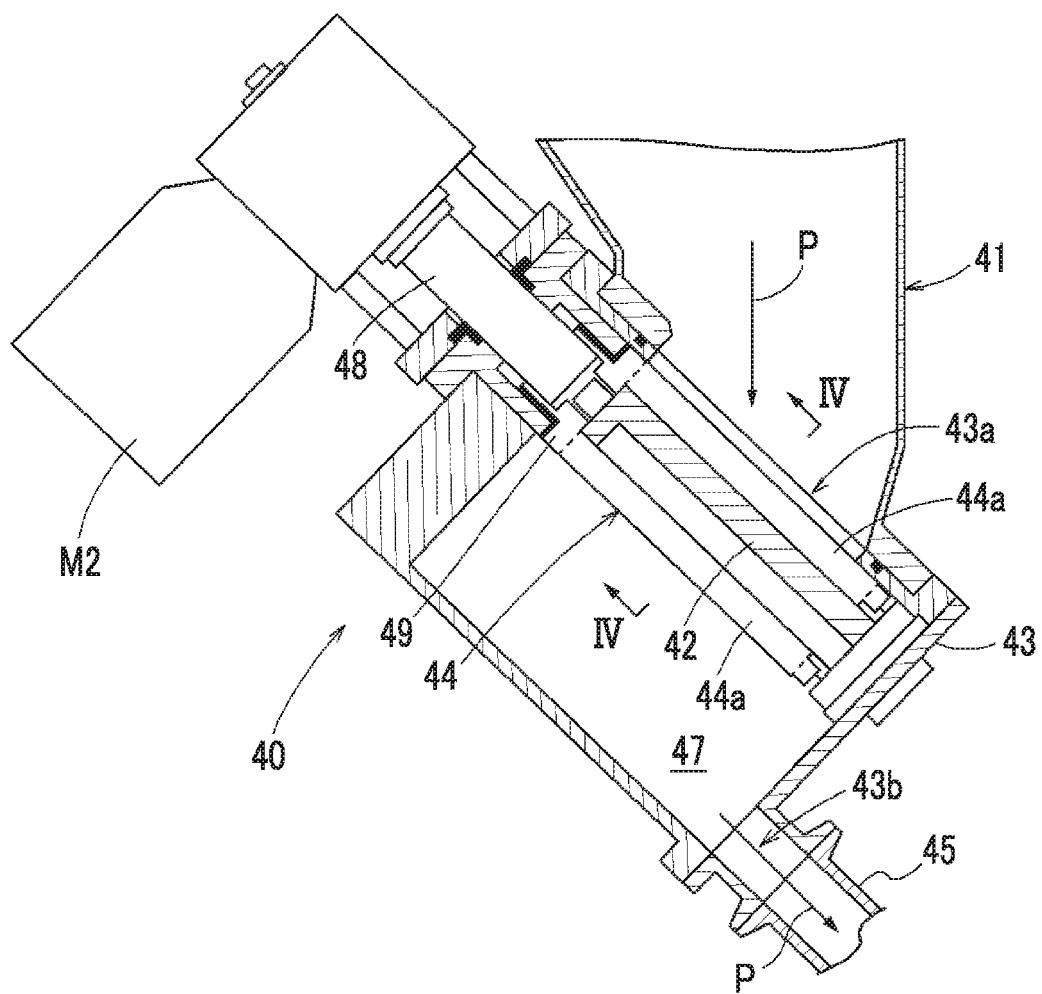
FIG. 3 is a longitudinal sectional view illustrating a main part of a powder supply device.
Figure 4:
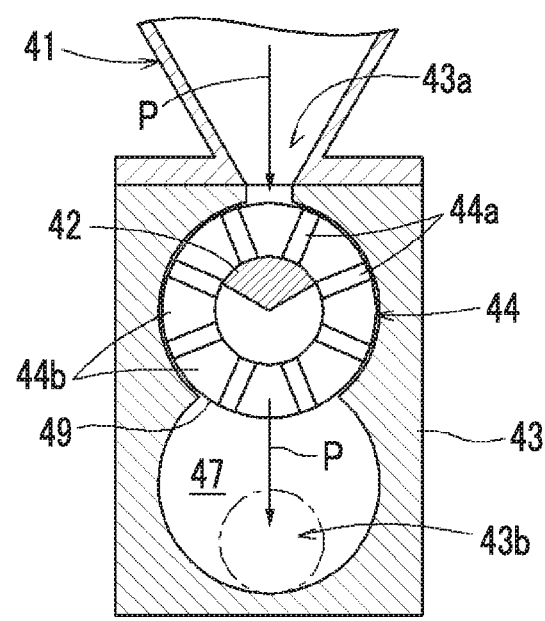
FIG. 4 is a cross-sectional view in a direction taken along the line IV-IV of FIG. 3.

As illustrated in FIGS. 2 to 4, the volumetric quantitative supply section 40 is a mechanism that quantitatively supplies a predetermined amount of the powder P supplied from the lower opening portion 31b of the hopper 31 to the suction pump mechanism portion Y on the downstream side.

Specifically, the quantitative supply section 40 is configured to include: an introduction portion 41 connected to the lower opening portion 31b of the hopper 31; a casing 43 provided with a feed port 43a and a discharge port 43b; a metering rotator 44 disposed to be rotatable in the casing 43; and a metering rotator drive motor M2 that drives the metering rotator 44 to rotate.

The introduction portion 41 is formed in a tubular shape that causes the lower opening portion 31b of the hopper 31 to communicate with the feed port 43a formed in the upper portion of the casing 43, and has a slit-shaped opening formed in the same shape as the feed port 43a of the casing 43 at the lowermost end thereof. The introduction portion 41 is formed in a tapered shape that decreases in thickness toward the feed port 43a side of the casing 43. The shape of the slit-shaped opening can be appropriately set according to the size of the hopper 31, the supply amount of the powder P, the characteristics of the powder P, and the like, and for example, the dimension of the slit-shaped opening is set to about 20 to 100 mm in a longitudinal direction and to about 1 to 5 mm in a width direction.

The casing 43 is formed in a substantially rectangular parallelepiped shape and is connected to the hopper 31 via the introduction portion 41 in a posture inclined at 45 degrees with respect to the horizontal direction (left-right direction in FIG. 2).

As illustrated in FIGS. 3 and 4, the upper surface of the casing 43 is provided with the slit-shaped feed port 43a corresponding to the slit-shaped opening of the introduction portion 41, and the powder P from the lower opening portion 31b of the hopper 31 can be supplied into the casing 43. The lower portion of the lower side surface (right side surface in FIG. 3) of the casing 43 disposed in an inclined manner is provided with the discharge port 43b that discharges the powder P, which is quantitatively supplied by the metering rotator 44, to the suction pump mechanism portion Y on the downstream side via an expansion chamber 47, and a powder discharge pipe 45 is connected to the discharge port 43b. The expansion chamber 47 is provided at a position in the casing 43 to which the powder P supplied from the feed port 43a to a powder accommodation chamber 44b of the metering rotator 44 is quantitatively supplied, and is maintained at a lower pressure than the feed port 43a (for example, about −0.06 MPa) by the negative pressure suction force acting from the discharge port 43b. That is, the discharge port 43b is connected to the primary side of the suction pump mechanism portion Y such that the negative pressure suction force acts on the expansion chamber 47 and the expansion chamber 47 is maintained at a lower pressure than the feed port 43a. With the rotation of the metering rotator 44, the state of each powder accommodation chamber 44b is changed to a negative pressure state (for example, about −0.06 MPa) and a higher pressure state than the negative pressure state.

The metering rotator 44 is configured by attaching a plurality of (for example, eight) plate-shaped partition walls 44a to a disk member 49 disposed on a drive shaft 48 of the metering rotator drive motor M2 radially at equal intervals except for the center portion of the disk member 49, and is configured to form the powder accommodation chambers 44b into a plurality of (for example, eight) partitions circumferentially at equal intervals. The powder accommodation chamber 44b is configured to be open to the outer peripheral surface and the center portion of the metering rotator 44. An opening closing member 42 is disposed in a fixed manner at the center portion of the metering rotator 44 unevenly in a circumferential direction and is configured to close or open the opening of each powder accommodation chamber 44b on the center portion side according to the rotation phase. The supply amount of the powder P can be adjusted by changing the rotating speed of the metering rotator 44 by the metering rotator drive motor M2 that drives the metering rotator 44 to rotate.

With the rotation of the metering rotator 44, each powder accommodation chamber 44b is configured to repeatedly change the state thereof in order of an expansion chamber opened state which is opened to the expansion chamber 47, a first sealed state which does not communicate with the expansion chamber 47 and the feed port 43a, a feed port opened state which is opened to the feed port 43a, and a second sealed state which does not communicate with the expansion chamber 47 and the feed port 43a. The casing 43 is formed such that the opening of the metering rotator 44 on the outer peripheral surface side is closed in the first sealed state and the second sealed state, and the opening closing member 42 is disposed to be fixed to the casing 43 such that the opening of the metering rotator 44 on the center portion side is closed in the first sealed state, the feed port opened state, and the second sealed state.

Therefore, in the powder supply device X, the powder P stored in the hopper 31 is supplied to the quantitative supply section 40 while being stirred by the stirring blade 32A, and the powder P is quantitatively supplied by the quantitative supply section 40 from the discharge port 43b to the suction pump mechanism portion Y through the powder discharge pipe 45.

More specifically, the pressure in the expansion chamber 47 in the casing 43 is in a negative pressure state (for example, about −0.06 MPa) due to the negative pressure suction force from the suction pump mechanism portion Y connected to the downstream side of the discharge port 43b of the quantitative supply section 40. On the other hand, since the upper opening portion 31a of the hopper 31 is open to the atmosphere, the inside of the hopper 31 is in a state of about atmospheric pressure. The inside of the introduction portion 41 and the vicinity of the lower opening portion 31b communicating with the expansion chamber 47 via the gap of the metering rotator 44 are in a pressure state between the negative pressure state and the atmospheric pressure state.

In this state, as the powder P in the vicinity of the inner wall surface of the hopper 31 and the lower opening portion 31b is stirred by the stirring blade 32A of the stirring mechanism 32, the powder Pin the hopper 31 is crushed by a shearing action of the stirring blade 32A and the metering rotator 44 is rotated by the metering rotator drive motor M2, so that the empty powder accommodation chambers 44b sequentially enter a state of communicating with the feed port 43a. In addition, the powder P in the hopper 31 flows down through the introduction portion 41 from the lower opening portion 31b and is sequentially accommodated in a predetermined amount in the powder accommodation chambers 44b of the metering rotator 44 that are in the state of communicating with the feed port 43a, and the powder P accommodated in the powder accommodation chambers 44b flows down to the expansion chamber 47 and is discharged from the discharge port 43b. Therefore, the powder P can be quantitatively supplied by the powder supply device X to a feed port 11 of the suction pump mechanism portion Y continuously in a predetermined amount through the powder discharge pipe 45.

In the above description, the powder P in the hopper 31 is supplied to the suction pump mechanism portion Y via the quantitative supply section 40. However, in a case of a powder P having adhesiveness, the quantitative supply section 40 is not used, and for example, the powder P may be directly supplied to the suction pump mechanism portion Y via the hopper 31 from the feeder 220 by controlling the rotation thereof. In this case, for example, a configuration in which a passage that directly connects the hopper 31 and the suction pump mechanism portion Y is separately formed to be switchable between the supply of the powder P from the hopper 31 to the suction pump mechanism portion Y via the quantitative supply section 40 and the supply of the powder P from the hopper 31 to the suction pump mechanism portion Y, depending on the properties of the powder P, is preferable.

As illustrated in FIG. 2, a shutter valve 46 capable of stopping the supply of the powder P to the feed port 11 of the suction pump mechanism portion Y is disposed in the powder discharge pipe 45.

Solvent Supply Section

As illustrated in FIGS. 1 and 2, the tank 260 is configured to continuously supply the liquid R in the tank 260 to the feed port 11 of the suction pump mechanism portion Y at a set flow rate. Therefore, the tank 260 functions as a solvent supply source that supplies the liquid R to the suction pump mechanism portion Y. In addition, the slurry F is supplied to the tank 260 from the recirculation mechanism portion 70 via a discharge path 22. Therefore, the tank 260 functions as a slurry recovery source for recovering the slurry F.

The tank 260 is provided with: a solvent supply pipe 52 that connects the tank 260 to the mixing mechanism 60 and causes the liquid R to pass therethrough; a pump 261 that is provided in the solvent supply pipe 52 and delivers the liquid R from the tank 260 to the mixing mechanism 60 via the solvent supply pipe 52; and a flow rate adjusting valve (not illustrated) that adjusts the flow rate of the liquid R delivered from the tank 260 to the solvent supply pipe 52 to a set flow rate.

Figure 5:
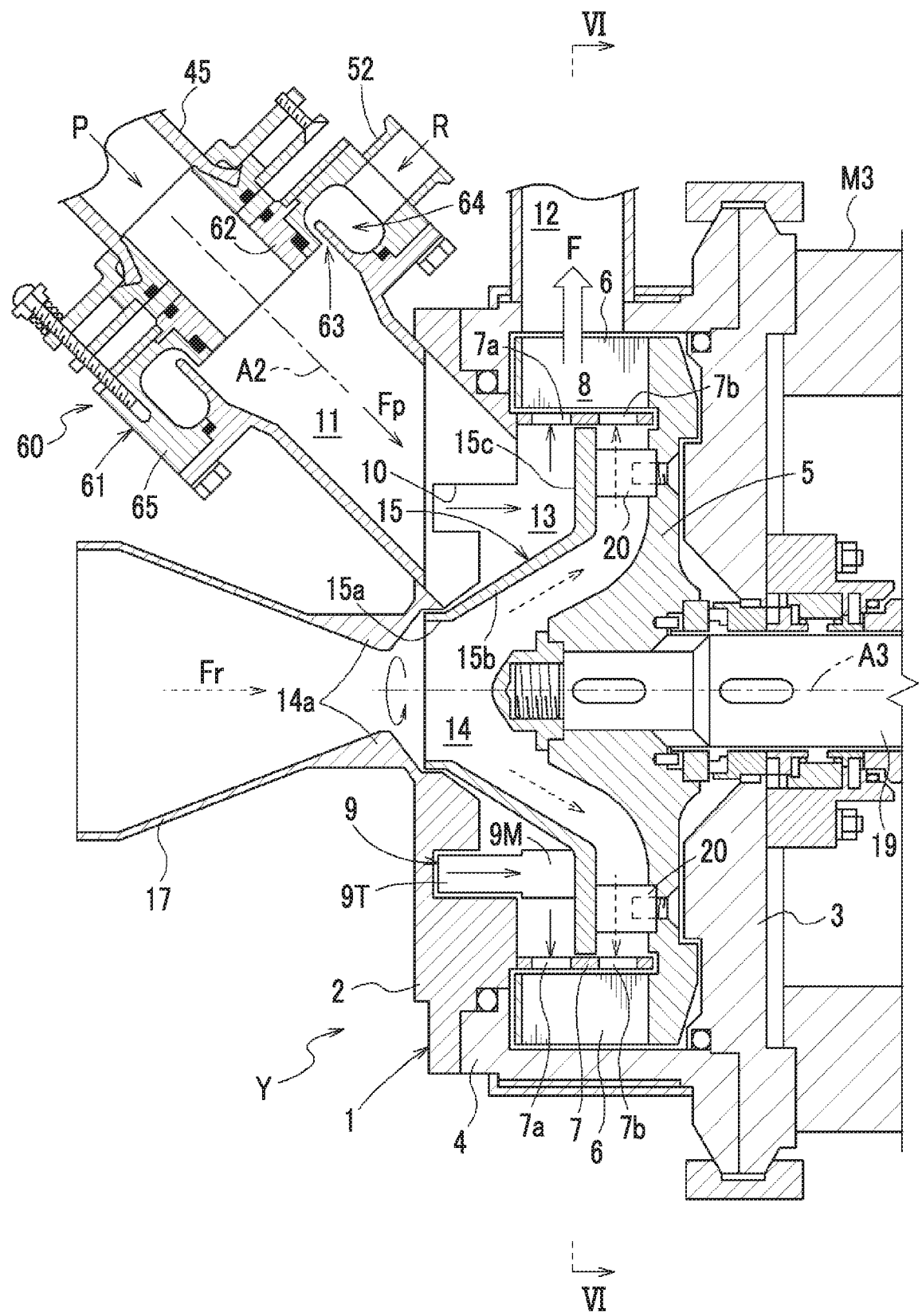
FIG. 5 is a longitudinal sectional side view of the centrifugal suction pump mechanism portion.

The mixing mechanism 60 mixes the liquid R adjusted to the set flow rate with the powder P quantitatively supplied from the quantitative supply section 40 and supplies the mixture to the feed port 11. As illustrated in FIG. 5, the mixing mechanism 60 is configured to include a mixing member 61 that causes the powder discharge pipe 45 and the solvent supply pipe 52 to communicate with and be connected to the feed port 11.

The mixing member 61 is configured to include: a tubular portion 62 that is configured to have a smaller diameter than the cylindrical feed port 11 and is disposed in a state of being inserted into the feed port 11 so as to form an annular slit 63 with the feed port 11; and an annular flow path forming portion 65 that forms an annular flow path 64 in the outer peripheral portion of the feed port 11 in a state of communicating with the annular slit 63 over the entire circumference.

The powder discharge pipe 45 is connected to the mixing member 61 in a state of communicating with the tubular portion 62, and the solvent supply pipe 52 is connected to the mixing member 61 to supply the liquid R to the annular flow path 64 in a tangential direction.

The powder discharge pipe 45, the tubular portion 62 of the mixing member 61, and the feed port 11 are disposed to be inclined such that an axial center A2 thereof is in an inclined posture in which the supply direction is downward (the angle with respect to the horizontal plane (left-right direction in FIG. 2) is about 45 degrees).

That is, the powder P discharged from the discharge port 43b of the quantitative supply section 40 to the powder discharge pipe 45 is introduced into the feed port 11 along the axial center A2 through the tubular portion 62 of the mixing member 61. On the other hand, since the liquid R is supplied to the annular flow path 64 in the tangential direction, the liquid R is supplied to the feed port 11 via the annular slit 63 formed on the inner peripheral side of the annular flow path 64 in the form of a hollow cylindrical vortex without a break.

Therefore, the powder P and the liquid R are uniformly premixed by the cylindrical feed port 11, and a preliminary mixture Fp thereof is suctioned and introduced into a supply chamber 13 of the suction pump mechanism portion Y.

Suction Pump Mechanism Portion

The suction pump mechanism portion Y will be further described with reference to FIGS. 2 and 5 to 8.

As illustrated in FIG. 5, the suction pump mechanism portion Y includes a main body casing 1 including a cylindrical outer peripheral wall portion 4 whose both end opening portions are closed by a front wall portion 2 and a rear wall portion 3, and is configured to include a rotor 5 that is concentrically provided inside the main body casing 1 so as to be driven to rotate, a cylindrical stator 7 that is concentrically disposed inside the main body casing 1 and fixed to the front wall portion 2, a pump drive motor M3 that drives the rotor 5 to rotate, and the like.

Figure 6:
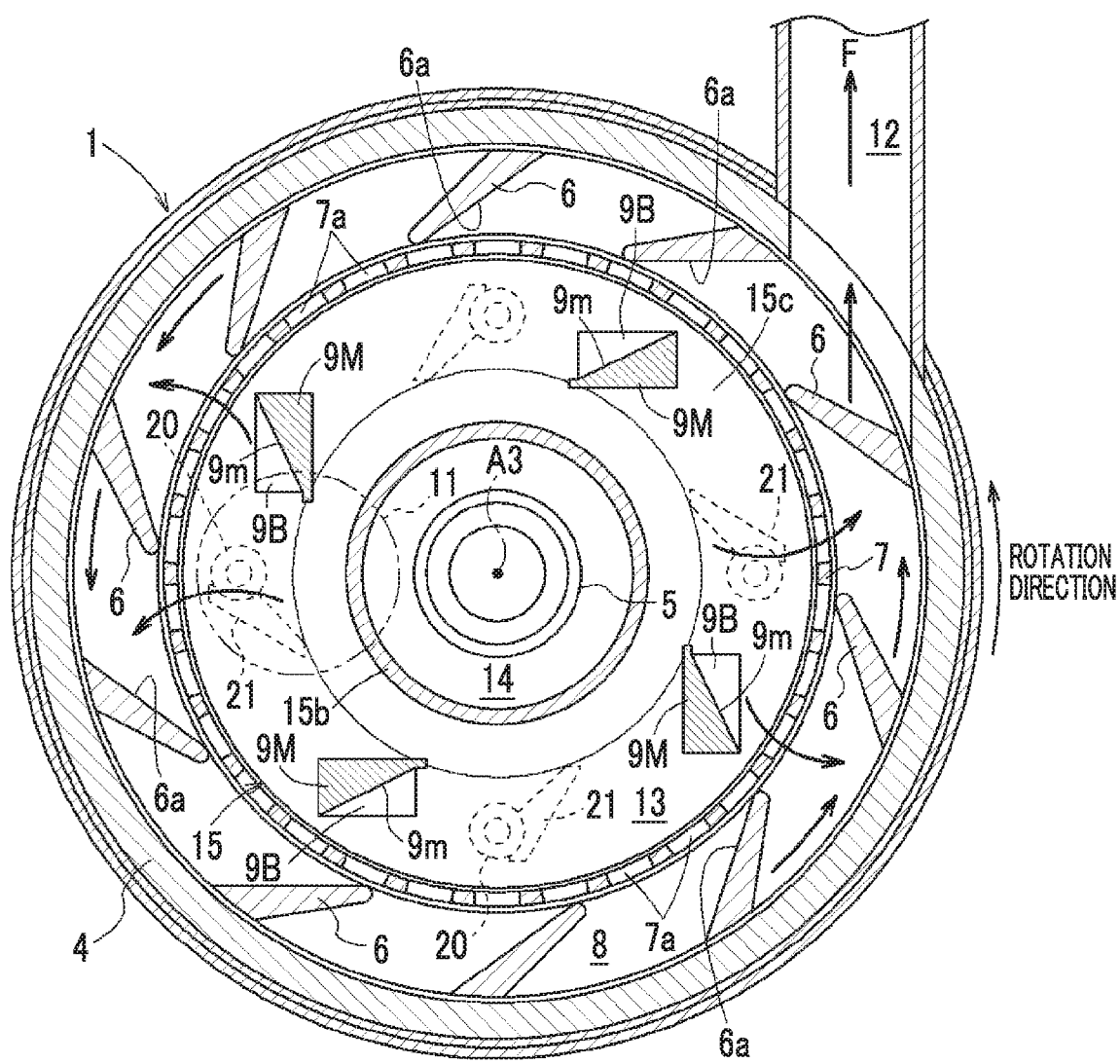
FIG. 6 is a cross-sectional view in a direction taken along the line VI-VI of FIG. 5.

As illustrated also in FIG. 6, on the radially outer side of the rotor 5, a plurality of rotor blades 6 are provided integrally with the rotor 5 in a state of protruding toward the front side (left side in FIG. 5) which is the front wall portion 2 side and being arranged at equal intervals in the circumferential direction.

The cylindrical stator 7 is provided with a plurality of through-holes 7a and 7b arranged in the circumferential direction, the stator 7 is disposed to be fixed to the front wall portion 2 while being located on the front side of the rotor 5 (left side in FIG. 5) and on the radially inner side of the rotor blades 6, and an annular blade chamber 8 in which the rotor blades 6 revolve is formed between the stator 7 and the outer peripheral wall portion 4 of the main body casing 1.

As illustrated in FIGS. 5 to 7, the feed port 11 through which the preliminary mixture Fp, in which the powder P and the liquid R are premixed by the mixing mechanism 60, is suctioned and introduced to the inside of the main body casing 1 by the rotation of the rotor blades 6 is provided at a position shifted to the outer peripheral side with respect to the center axis (an axial center A3 of the main body casing 1) of the front wall portion 2.

As illustrated in FIGS. 5 and 7, an annular groove 10 is formed on the inner surface of the front wall portion 2 of the main body casing 1, and the feed port 11 is provided in a state of communicating with the annular groove 10.

As illustrated in FIG. 5 and FIG. 6, a cylindrical discharge portion 12 that discharges the slurry F produced by mixing the powder P and the liquid R is provided at a point in the circumferential direction of the cylindrical outer peripheral wall portion 4 of the main body casing 1 so as to extend in the tangential direction of the outer peripheral wall portion 4 in a state of communicating with the blade chamber 8.

As illustrated in FIGS. 2 and 5, in this embodiment, the slurry F discharged from the discharge portion 12 is supplied to the recirculation mechanism portion 70 through a discharge path 18, and an introduction port 17 that circulates and supplies an undissolved slurry Fr from which bubbles are separated in a cylindrical container 71, which is a separation portion of the recirculation mechanism portion 70, into the main body casing 1 via a circulation path 16 is provided at the center portion (concentric with the axial center A3) of the front wall portion 2 of the main body casing 1.

As illustrated in FIGS. 5 to 7, a partition plate 15 that partitions the inner peripheral side of the stator 7 into a supply chamber 13 on the front wall portion 2 side and an introduction chamber 14 on the rotor 5 side is provided on the front side of the rotor 5 in a state of rotating integrally with the rotor 5, and scraping blades 9 are provided on the front wall portion 2 side of the partition plate 15. A plurality of (in FIG. 7, four) the scraping blades 9 are concentrically provided at equal intervals in the circumferential direction, and each of the scraping blades 9 is disposed to revolve integrally with the rotor 5 in a state where a tip part 9T enters the annular groove 10.

The supply chamber 13 and the introduction chamber 14 are configured to communicate with the blade chamber 8 via the plurality of through-holes 7a and 7b of the stator 7, the feed port 11 is configured to communicate with the supply chamber 13, and the introduction port 17 is configured to communicate with the introduction chamber 14.

Specifically, the supply chamber 13 and the blade chamber 8 communicate with each other through a plurality of the supply chamber side through-holes 7a arranged at equal intervals in the circumferential direction at a portion of the stator 7 facing the supply chamber 13, and the introduction chamber 14 and the blade chamber 8 communicate with each other through a plurality of the introduction chamber side through-holes 7b arranged at equal intervals in the circumferential direction at a portion of the stator 7 facing the introduction chamber 14.

Each portion of the suction pump mechanism portion Y will be further described.

As illustrated in FIG. 5, the rotor 5 is configured to have a shape in which the front surface swells substantially in the shape of a truncated cone, and is provided with the plurality of rotor blades 6 arranged at equal intervals in a state of protruding forward on the outer peripheral side thereof. In FIG. 6, ten rotor blades 6 are arranged at equal intervals in the circumferential direction. Furthermore, the rotor blade 6 is formed to protrude from the outer peripheral side toward the inner peripheral side of the rotor 5 so as to be inclined backward in the rotation direction from the inner peripheral side toward the outer peripheral side, and the inner diameter of the tip parts of the rotor blades 6 is formed to be slightly larger than the outer diameter of the stator 7.

The rotor 5 is connected to a drive shaft 19 of the pump drive motor M3 that passes through the rear wall portion 3 and is inserted into the main body casing 1, in a state of being concentric with the main body casing 1 in the main body casing 1, and is driven by the pump drive motor M3 to rotate.

The rotor 5 is configured to generate so-called local boiling (cavitation) on a surface (back surface) 6a which becomes the rear side in the rotation direction of the rotor blade 6 by being driven to rotate in a direction in which the tip part of the rotor blade 6 faces forward when viewed in the axial center direction (viewed in a direction taken along the line VI-VI of FIG. 5 as illustrated in FIG. 6).

As illustrated in FIGS. 5 and 7 to 8C, the partition plate 15 is configured in a generally funnel shape having an outer diameter slightly smaller than the inner diameter of the stator 7. Specifically, the funnel-shaped partition plate 15 is configured in a shape provided with a funnel-shaped portion 15b which is open at a tubular sliding contact portion 15a with a top protruding in a cylindrical shape at the center thereof, and an annular flat plate portion 15c at the outer peripheral portion of the funnel-shaped portion 15b with both the front surface and the rear surface being in a state perpendicular to the axial center A3 of the main body casing 1.

As illustrated in FIGS. 5 and 6, the partition plate 15 is attached to attachment portions 5a of the front surface of the rotor 5 via spacing members 20 arranged at a plurality of (in this embodiment, four) points with equal intervals therebetween in the circumferential direction in a posture in which the tubular sliding contact portion 15a of the top faces the front wall portion 2 side of the main body casing 1.

Figure 8A:
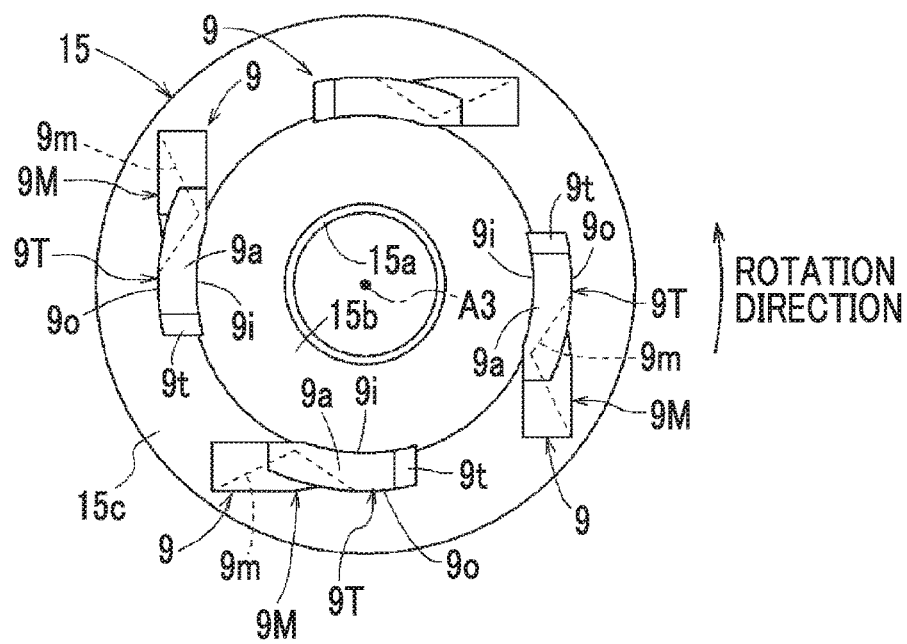
FIGS. 8A, 8B, and 8C each show a schematic configuration view of the partition plate.
Figure 8B:
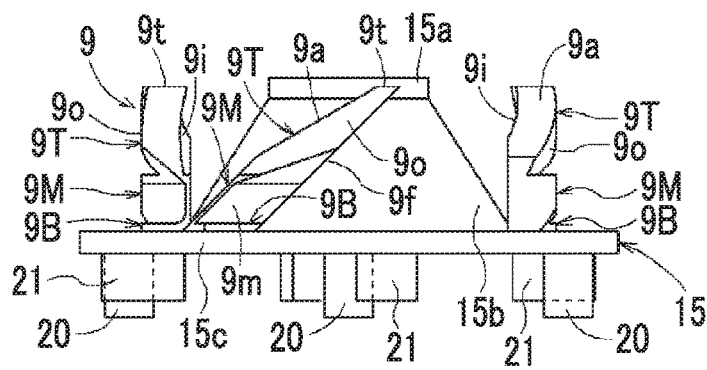
Figure 8C:
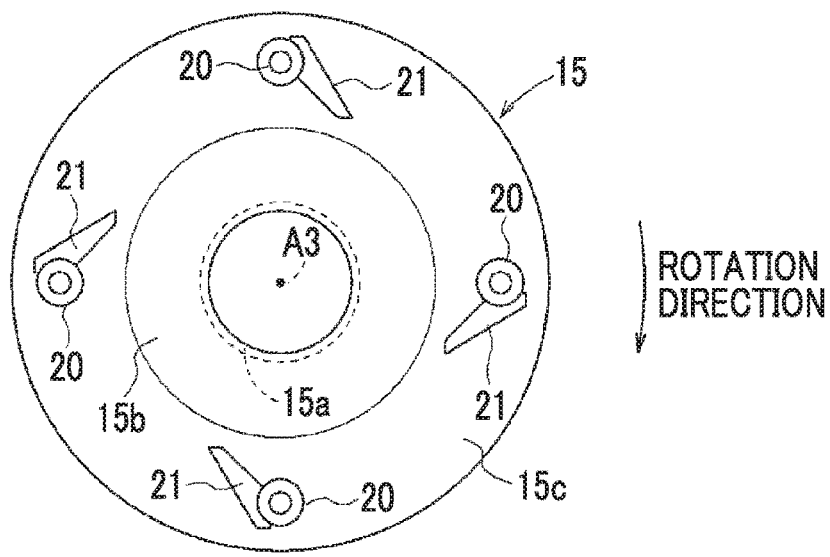

As illustrated in FIGS. 6 and 8C, when the partition plate 15 is attached to the rotor 5 via the spacing members 20 respectively at the plurality of points, stirring blades 21 are assembled integrally with the partition plate 15 in a posture facing the rear wall portion 3 side of the main body casing 1, and when the rotor 5 is driven to rotate, the four stirring blades 21 are rotated integrally with the rotor 5.

As illustrated in FIGS. 5 and 7, in this embodiment, the cylindrical introduction port 17 is provided at the center of the front wall portion 2 of the main body casing 1 concentrically with the main body casing 1. In the introduction port 17, a throttle portion 14a having a diameter smaller than the inner diameter of the circulation path 16 and smaller than that of the tubular sliding contact portion 15a of the partition plate 15 and thus having a small flow path area is formed. As the rotor blades 6 of the rotor 5 are rotated, the slurry F is discharged via the discharge portion 12, and the undissolved slurry Fr is introduced via the throttle portion 14a of the introduction port 17, so that the inside of the suction pump mechanism portion Y is reduced in pressure.

As illustrated in FIGS. 5 to 7, the feed port 11 is provided in the front wall portion 2 to be located on the lateral side of the opening portion of the introduction port 17 with respect to the inside of the main body casing 1 in a state in which the opening portion (inlet portion) thereof open to the inside of the main body casing 1 includes a circumferential portion of the annular groove 10 therein. Furthermore, the feed port 11 is provided in the front wall portion 2 of the main body casing 1 in a posture in which the axial center A2 is parallel to the axial center A3 of the main body casing 1 in a plan view (viewed in the up-down direction of FIGS. 2 and 5) and the axial center A2 is inclined downward in a direction approaching the axial center A3 of the main body casing 1 as it goes to the front wall portion 2 of the main body casing 1 when viewed in the horizontal direction (viewed in a direction into the paper of FIGS. 2 and 5) perpendicular to the axial center A3 of the main body casing 1. In addition, the downward inclination angle of the feed port 11 with respect to the horizontal direction (the left-right direction of FIGS. 2 and 5) is about 45 degrees as described above.

As illustrated in FIGS. 5 and 7, the stator 7 is attached to the inner surface (the surface facing the rotor 5) of the front wall portion 2 of the main body casing 1, and is fixed so that the front wall portion 2 of the main body casing 1 and the stator 7 are integrated. In the stator 7, the plurality of supply chamber side through-holes 7a arranged at the portion facing the supply chamber 13 are formed in a substantially circular shape to be set such that the total flow path area of the plurality of supply chamber side through-holes 7a is smaller than the flow path area of the supply chamber 13. In addition, the plurality of introduction chamber side through-holes 7b arranged at the portion facing the introduction chamber 14 are formed in a substantially elliptical shape to be set such that the total flow path area of the plurality of introduction chamber side through-holes 7b is smaller than the flow path area of the introduction chamber 14. As the rotor blades 6 of the rotor 5 are rotated, the slurry F is discharged via the discharge portion 12, the preliminary mixture Fp is supplied via the supply chamber side through-holes 7a of the supply chamber 13, and the undissolved slurry Fr is introduced via the introduction port 17, so that the inside of the suction pump mechanism portion Y is reduced in pressure.

As illustrated in FIGS. 7 to 8C, in this embodiment, each scraping blade 9 is formed in a rod shape, and a base end part 9B of the rod-shaped scraping blade 9 is fixed to rotate integrally with the rotor 5 in an inclined posture in which the scraping blade 9 is located closer to the front wall portion 2 toward the tip end side of the rod-shaped scraping blade 9 when viewed in the radial direction of the rotor 5 (viewed in a direction into the paper of FIG. 8B) and is located closer to the radially inner side of the rotor 5 toward the tip end side of the rod-shaped scraping blade 9 when viewed in the axial center direction of the rotor 5 (viewed in a direction into the paper of FIG. 8A), and the rotor 5 is driven to rotate in a direction (direction indicated by arrows in FIGS. 5 to 8C) in which the tip of the scraping blade 9 faces forward when viewed in the axial center direction (viewed in the direction into the paper of FIG. 8A).

The scraping blade 9 will be further described with reference to FIGS. 6 to 8C.

The scraping blade 9 is configured in a rod shape provided with the base end part 9B fixed to the partition plate 15, an intermediate portion 9M in a state of being exposed to the supply chamber 13, and the tip part 9T in a state of being fitted in (that is, entering) the annular groove 10 in series in a direction from the base to the tip.

As illustrated in FIGS. 6, 7, and 8B, the base end part 9B of the scraping blade 9 is configured in a substantially rectangular plate shape.

As illustrated in FIGS. 6, 7, 8A and 8B, the intermediate portion 9M of the scraping blade 9 is configured in a substantially triangular prism shape whose transverse sectional shape is generally triangular (in particular, see FIG. 6). By providing the scraping blade 9 in the inclined posture as described above, one side surface 9m (hereinafter, sometimes referred to as a radiating surface) facing the forward side in the rotation direction of the rotor 5 among the three side surfaces of the intermediate portion 9M having the triangular prism shape is configured to have a forward downward shape inclined toward the forward side in the rotation direction of the rotor 5 to face the radially outer side (hereinafter, sometimes referred to as diagonally outward) of the rotor 5 in the radial direction (in particular, see FIGS. 7 to 8C).

That is, by providing the rod-shaped scraping blade 9 in the inclined posture as described above, the intermediate portion 9M exposed to the supply chamber 13 of the scraping blade 9 is located closer to the radially outer side of the rotor 5 than the tip part 9T fitted into the annular groove 10, and the radiating surface 9m facing the forward side in the rotation direction of the intermediate portion 9M has a forward downward shape inclined toward the forward side in the rotation direction of the rotor 5 and inclined diagonally outward with respect to the radial direction of the rotor 5. Accordingly, the preliminary mixture Fp scraped from the annular groove 10 by the tip part 9T of the scraping blade 9 is guided to flow toward the radially outer side of the rotor 5 in the supply chamber 13 by the radiating surface 9m of the intermediate portion 9M of the scraping blade 9.

As illustrated in FIGS. 7, 8A, and 8B, the tip part 9T of the scraping blade 9 has a substantially quadrangular prism shape with a substantially rectangular transverse sectional shape, and is configured in an arc shape in a state where an outward side surface 9o facing the radially outer side of the rotor 5 among the four side surfaces when viewed in the axial center direction of the rotor 5 (viewed in the direction into the paper of FIG. 8A) is directed along an inward inner surface facing the radially inner side in the inner surface of the annular groove 10, and an inward side surface 9i facing the radially inner side of the rotor 5 among the four side surfaces is directed along an outward inner surface facing the radially outer side in the inner surface of the annular groove 10.

In addition, among the four side surfaces of the tip part 9T having the quadrangular prim shape, a scraping surface 9f facing the forward side in the rotation direction of the rotor 5 is configured in a forward downward shape inclined toward the forward side in the rotation direction of the rotor 5 to face the radially outer side (hereinafter, sometimes referred to as diagonally outward) of the rotor 5 in the radial direction.

Accordingly, the preliminary mixture Fp scraped from the annular groove 10 by the tip part 9T of the scraping blade 9 is directed radially outward of the rotor 5 by the scraping surface 9f of the tip part 9T of the scraping blade 9 and discharged into the supply chamber 13.

Furthermore, a tip surface 9t of the tip part 9T of the scraping blade 9 is configured to be parallel to the bottom surface of the annular groove 10 in a state where the tip part 9T is fitted in the annular groove 10.

When the rotor 5 is driven to rotate in a direction in which the tip of the scraping blade 9 is directed forward when viewed in the axial center direction (viewed in the direction into the paper in FIG. 8A), a surface (back surface) 9a which becomes the rear side in the rotation direction is formed in each of the base end part 9B, the intermediate portion 9M, and the tip part 9T of the scraping blade 9.

The four scraping blades 9 configured in the above-described shape are respectively provided with the base end parts 9B fixed to the annular flat plate portion 15c of the partition plate 15 in a form of being arranged in the circumferential direction at intervals of 90 degrees at the central angle in the inclined posture as described above.

As illustrated in FIG. 5, the partition plate 15 provided with the scraping blades 9 is attached to the attachment portions 5a of the front surface of the rotor 5 in a state of being spaced with a gap from the front surface of the rotor 5 by the spacing members 20, and the rotor 5 is disposed in the main body casing 1 in a state where the tubular sliding contact portion 15a of the partition plate 15 is fitted in the introduction port 17 so as to be slidably rotatable.

Then, the introduction chamber 14 having a tapered shape that decreases in diameter toward the front wall portion 2 side of the main body casing 1 is formed between the swelling front surface of the rotor 5 and the rear surface of the partition plate 15, and the introduction port 17 is configured to communicate with the introduction chamber 14 via the tubular sliding contact portion 15a of the partition plate 15.

The annular supply chamber 13 communicating with the feed port 11 is formed between the front wall portion 2 of the main body casing 1 and the front surface of the partition plate 15.

When the rotor 5 is driven to rotate, the partition plate 15 rotates integrally with the rotor 5 in a state where the tubular sliding contact portion 15a is in contact with the introduction port 17, and even in the state where the rotor 5 and the partition plate 15 rotate, the state where the introduction port 17 communicates with the introduction chamber 14 via the tubular sliding contact portion 15a of the partition plate 15 is maintained.

Recirculation Mechanism Portion

The recirculation mechanism portion (an example of a separation portion) 70 is configured to separate the dissolved liquid in the cylindrical container 71 by specific gravity, and as illustrated in FIG. 2, is configured to separate, from the slurry F supplied from the discharge portion 12 of the suction pump mechanism portion Y through the discharge path 18, the undissolved slurry Fr in a state in which the powder P that is not completely dissolved may be contained to be supplied to circulation path 16, and the slurry F in a state in which the powder P is almost completely dissolved to be supplied to the discharge path 22. The discharge path 18 and the circulation path 16 are both connected to the lower portion of the cylindrical container 71, and the discharge path 22 is connected to the upper portion of the cylindrical container 71 and the tank 260 which is a supply destination of the slurry F.

Here, although not illustrated, the recirculation mechanism portion 70 is configured such that an introduction pipe to which the discharge path 18 is connected is disposed so as to protrude toward the inside from the bottom surface of the cylindrical container 71, a discharge portion connected to the discharge path 22 is provided in the upper portion of the cylindrical container 71, a circulation portion connected to the circulation path 16 is provided in the lower portion, and a twisted plate that turns the flow of the slurry F discharged from the introduction pipe is disposed at the discharge upper end of the introduction pipe. Accordingly, bubbles of the liquid R can be separated from the slurry F, and the undissolved slurry Fr circulated and supplied to the circulation path 16 can be supplied into the introduction chamber 14 in a state where the bubbles of the liquid R are separated.

Control Unit

In particular, the control unit C is configured to control the rotating speed of the rotor 5 (rotor blades 6), and is configured to set the rotating speed of the rotor blades 6 so that the pressure of the outlet region of the supply chamber side through-holes 7a and the introduction chamber side through-holes 7b (throttle through-holes) of the stator 7 becomes equal to or lower than the saturation vapor pressure of the liquid R (3.169 kPa incase of water at 25° C.) over the entire circumference of the outlet region, and by rotating the rotor blades 6 at the set rotating speed, at least a region in the blade chamber 8 immediately after passing the supply chamber side through-holes 7a and the introduction chamber side through-holes 7b of the stator 7 is formed as a fine bubble region in which a large number of fine bubbles (microbubbles) of the liquid R are generated, continuously over the entire circumference in the blade chamber 8.

Operation of Slurry Manufacturing Device

Next, the operation of the slurry manufacturing device 200 will be described.

First, the powder dry box 230 and the main body dry box 240 are operated to lower the dew point temperatures. The cooling device 250 is operated. By adjusting the dehumidifying unit 233, the atmospheric pressure of the inner box 232 is set to a positive pressure (a state higher than the outside air pressure by about 2 to 3 Pa), the atmospheric pressure of the outer box 231 is set to a negative pressure (a state lower than the outside air pressure by about 2 to 3 Pa).

Next, the rotor 5 is rotated in a state where suction of the powder P via the powder discharge pipe 45 is stopped by closing the shutter valve 46, and thereafter only the liquid R of the tank 260 is supplied by operating the pump 261 to start the operation of the suction pump mechanism portion Y. By supplying the liquid R to the suction pump mechanism portion Y after rotating the rotor 5, a mechanical seal on the back surface of the rotor 5 is brought into close contact with the rotor 5, and liquid leakage from the back surface of the rotor 5 can be prevented.

Due to the negative pressure suction force of the suction pump mechanism portion Y, the liquid R is quantitatively supplied to the mixing member 61 of the mixing mechanism 60 continuously in a predetermined amount.

When a predetermined operation time has elapsed and the inside of the suction pump mechanism portion Y is in a negative pressure state (for example, a vacuum state of about −0.06 MPa), the shutter valve 46 is opened. Accordingly, the expansion chamber 47 of the powder supply device X is brought into a negative pressure state (about −0.06 MPa), and the inside of the introduction portion 41 and the vicinity of the lower opening portion 31b of the hopper 31 are brought into a pressure state between the negative pressure state and the atmospheric pressure state.

Then, the powder P is supplied from the feeder 220 to the hopper 31 by operating the powder supply device X. The powder P stored in the hopper 31 is quantitatively supplied to the mixing member 61 of the mixing mechanism 60 continuously in a predetermined amount via the expansion chamber 47 of the quantitative supply section 40 from the lower opening portion 31b of the hopper 31 by the stirring action of the stirring blade 32A and the negative pressure suction force of the suction pump mechanism portion Y.

In this case, depending on the properties of the powder, the quantitative supply section 40 is not used, and a predetermined amount of the powder may be supplied directly from the feeder 220 to the mixing mechanism 60 via the hopper 31. In this case, the powder is supplied to the mixing mechanism 60 by controlling the supply speed of the feeder 220 so as not to exceed the powder processing capability of the mixing mechanism 60.

The powder P is supplied from the mixing member 61 of the mixing mechanism 60 to the feed port 11 through the tubular portion 62 of the mixing member 61, and the liquid R is supplied to the feed port 11 through the annular slit 63 in the form of a hollow cylindrical vortex without a break, the powder P and the liquid R are premixed by the feed port 11, and the preliminary mixture Fp is introduced into the annular groove 10.

When the supply of the predetermined amount of the powder P is completed, the powder discharge port 221 and the shutter valve 46 are closed to stop the suction of the powder P via the powder discharge pipe 45 such that the supply of the powder to the suction pump mechanism portion Y from the powder supply device X is stopped. Then, the operation of the powder dry box 230 is stopped. The operation of the main body dry box 240 is continued.

When the rotor 5 is driven to rotate and the partition plate 15 rotates integrally with the rotor 5, the scraping blades 9 provided concentrically on the partition plate 15 revolve in a state where the tip parts 9T are fitted in the annular groove 10.

Then, as indicated by solid line arrows in FIGS. 5 and 6, the preliminary mixture Fp that flows through the feed port 11 and is introduced into the annular groove 10 is scraped by the tip parts 9T of the scraping blades 9 revolving while being fitted in the annular groove 10, and the scraped preliminary mixture Fp schematically flows in the supply chamber 13 in the rotation direction of the rotor 5 along the front surface of the funnel-shaped portion 15b and the front surface of the annular flat plate portion 15c in the partition plate 15, further flows into the blade chamber 8 through the supply chamber side through-holes 7a of the stator 7, flows in the blade chamber 8 in the rotation direction of the rotor 5, and is discharged from the discharge portion 12.

The preliminary mixture Fp introduced into the annular groove 10 undergoes a shearing action when scraped by the tip parts 9T of the scraping blades 9. In this case, a shearing action acts between the outward side surface 9o of the tip part 9T of the scraping blade 9 and the inward inner surface of the annular groove 10 on the inner side, and between the inward side surface 9i of the tip part 9T of the scraping blade 9 and the outward inner surface of the annular groove 10 on the inner side. Furthermore, a shearing action also acts when the preliminary mixture Fp passes through the supply chamber side through-holes 7a of the stator 7.

That is, since the shearing force can be applied to the preliminary mixture Fp in the supply chamber 13, the preliminary mixture Fp to be scraped out is mixed by receiving the shearing action from the scraping blades 9 and the supply chamber side through-holes 7a. Accordingly, the dispersion of the powder P with the liquid R is performed more favorably. Therefore, such a preliminary mixture Fp can be supplied, and good dispersion of the powder P with the liquid R in the blade chamber 8 can be expected.

The slurry F discharged from the discharge portion 12 is supplied to the recirculation mechanism portion 70 through the discharge path 18, and in the recirculation mechanism portion 70, the undissolved slurry Fr in a state of containing the powder P that is not completely dissolved and the slurry F in a state where the powder P is almost completely dissolved are separated from each other, and the bubbles of the liquid R are separated. The undissolved slurry Fr is supplied again to the introduction port 17 of the suction pump mechanism portion Y through the circulation path 16, and the slurry F is supplied to the tank 260 through the discharge path 22.

The undissolved slurry Fr is introduced into the introduction chamber 14 via the throttle portion 14a of the introduction port 17 in a state where the flow rate is limited. In the introduction chamber 14, the undissolved slurry Fr receives a shearing action by the plurality of rotating stirring blades 21, are further finely crushed, and are also further crushed by receiving a shearing action when passing through the introduction chamber side through-holes 7b. In this case, the undissolved slurry Fr is introduced into the blade chamber 8 in a state where the flow rate is limited via the introduction chamber side through-holes 7b. In the blade chamber 8, the slurry F that is crushed by receiving the shearing action by the rotor blades 6 rotating at a high speed and the generation of local boiling (cavitation) at the surface (back surface) 6a which becomes the rear side in the rotation direction of the rotor blade 6 and is thus further reduced in the amount of aggregates (mass) of the powder P is mixed with the slurry F from the supply chamber 13 and is discharged from the discharge portion 12.

Here, the rotating speed of the rotor blades 6 is set by the control unit so that the pressure in the blade chamber 8 which is the outlet region of the supply chamber side through-holes 7a and the introduction chamber side through-holes 7b of the stator 7 becomes equal to or lower than the saturation vapor pressure of the liquid R over the entire circumference, and the rotor blades 6 are rotated at the set rotating speed.

Accordingly, by setting the rotating speed of the rotor blades 6, the pressure in the blade chamber 8 which is the outlet region becomes equal to or lower than the saturation vapor pressure of the liquid R (3.169 kPa in the case of water at 25° C.) over the entire circumference. Therefore, at least in the region in the blade chamber 8 immediately after passing through the supply chamber side through-holes 7a and the introduction chamber side through-holes 7b of the stator 7, the generation of fine bubbles (microbubbles) is promoted by vaporization of the liquid R, so that the region enters a state of being formed as a fine bubble region in which a large number of fine bubbles generated continuously over the entire circumference in the blade chamber 8.

Crushing of the aggregates of the powder P is promoted by the expansion and contraction of the bubbles due to the cavitation generated here. As a result, a high-quality slurry F in which the powder P is favorably dispersed in the liquid R can be generated over almost the entire slurry F present on the entire circumference in the blade chamber 8.

Other Embodiments (1) In the above-described embodiment, the powder supply device X is configured to include the feeder hopper 210, the feeder 220, the hopper 31, and the like. As another form of the powder supply device X, a form in which the powder P is suctioned with a hose or the like from a bag containing the powder P is also possible. In this form, the opening portion of the powder supply device X is the opening of the bag and the suction port of the hose, and these opening portions are accommodated in the powder dry box 230.

(2) In addition to the configuration of the above-described embodiment, a configuration that monitors the amount of the powder P fed into the hopper 31 may be added.

For example, a sensor A capable of detecting the powder P is provided in the lower portion of the hopper 31 at a predetermined position from the lowermost end. The sensor A can detect that the powder P has been fed into the hopper 31 from the lowermost end of the hopper 31 to the predetermined position. In a case where the sensor A detects the powder P, a control unit (not illustrated) slows down the supply speed of the powder P from the feeder 220 to the hopper 31. Accordingly, excessive supply of the powder P to the hopper 31 can be suppressed, and clogging of the powder P in the hopper 31 and the like can be suppressed.

Furthermore, a sensor B that detects accumulation of the powder P in substantially the entire hopper 31 may be provided in the vicinity of the uppermost end of the hopper 31. In a case where the sensor B detects the powder P, a control unit (not illustrated) stops the supply of the powder P from the feeder 220 to the hopper 31. Accordingly, an overflow of the powder P from the hopper 31 can be suppressed.

(3) In the above-described embodiment, the powder dry box 230 has the outer box 231 and the inner box 232, and is thus configured a double box. However, the powder dry box 230 may be configured as a single box. In this case, the powder dry box 230 may be constituted only by the inner box 232. In addition, the dew point temperature of the inner box 232 is maintained at, for example, −70° C., similarly to the above-described embodiment. Furthermore, the atmospheric pressure of the inner box 232 is maintained at a positive pressure higher than the outside air pressure of the powder dry box 230, that is, for example, in a state higher than that by about 2 to 3 Pa.

The configurations disclosed in the above-described embodiments (including other embodiments, the same applies hereinafter) can be applied in combination with the configurations disclosed in the other embodiments as long as no contradiction arises. In addition, the embodiments disclosed in this specification are merely examples, and the embodiments of the present invention are not limited thereto and can be appropriately modified without departing from the scope of the embodiments of the present invention.

It should be understood that the invention is not limited to the above-described embodiment, but may be modified into various forms on the basis of the spirit of the invention. Additionally, the modifications are included in the scope of the invention.

What is claimed is:

1. A slurry manufacturing device comprising:
a mixing device configured to:
mix a liquid and a powder to manufacture a slurry;
a powder supply device configured to:
supply the powder to the mixing device; and
a powder dry box comprised of:
an outer box that is configured to be dehumidified by a dehumidifying unit, and
an inner box that is configured to be dehumidified by the dehumidifying unit,
wherein an opening portion of the powder supply device is accommodated in the powder dry box.

2. The slurry manufacturing device according to claim 1, wherein the powder supply device includes a hopper comprising an open upper side, and a feeder configured to supply the powder to the hopper, and
an opening portion of the hopper and a powder discharge port of the feeder are accommodated in the powder dry box.

3. The slurry manufacturing device according to claim 2, wherein the powder supply device includes a feeder hopper configured to supply the powder to the feeder, and
an air vent of the feeder hopper is connected to the powder dry box.

4. The slurry manufacturing device according to claim 1, further comprising:
a main body dry box that accommodates the mixing device therein.

5. The slurry manufacturing device according to claim 4, wherein a dew point temperature of the main body dry box is higher than a dew point temperature of the powder dry box.

6. The slurry manufacturing device according to claim 4, wherein a cooling device that cools the mixing device is accommodated in the main body dry box.

7. The slurry manufacturing device according to claim 1, wherein the mixing device is a centrifugal dispersion mixing pump.

8. The slurry manufacturing device according to claim 1, wherein the slurry is a positive electrode active material slurry, a negative electrode active material slurry, or a solid electrolyte slurry used for manufacturing an all-solid-state battery.

9. The slurry manufacturing device according to claim 1, wherein the powder contains a sulfide solid electrolyte.

10. The slurry manufacturing device according to claim 1, wherein the dehumidifying unit is controllable in a manner that causes a dew point temperature of the inner box to be lower than a dew point temperature of the outer box.

11. The slurry manufacturing device according to claim 1, wherein the inner box is configured to have a pressure in the inner box that is higher than an atmospheric pressure outside the powder dry box.

12. The slurry manufacturing device according to claim 11, wherein the inner box is configured to have a pressure in the outer box that is lower than the atmospheric pressure outside the powder dry box.

13. An operating method for the slurry manufacturing device, the method comprising:
mixing, by a mixing device, a liquid and a powder to manufacture a slurry;
supplying, by a powder supply device, the powder to the mixing device;
causing, while the powder supply device supplies the powder to the mixing device, both a powder dry box and a main body dry box to perform operations;
causing, when the supply of the powder from the powder supply device to the mixing device is completed, the powder dry box to stop an operation of the powder dry box and the main body dry box to perform an operation of the main body dry box,
wherein the powder dry box accommodates, in the powder dry box, an opening portion of the powder supply device, and
wherein the main body dry box accommodates, in the main body dry box, the mixing device.

* * * * *